(12) United States Patent
Hei Ma

(10) Patent No.: US 6,244,246 B1
(45) Date of Patent: Jun. 12, 2001

(54) STRATIFIED CHARGE ENGINE WITH 2 SPARKS PLUGS

(75) Inventor: Thomas Tsoi Hei Ma, Essex (GB)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/458,524

(22) Filed: Dec. 13, 1999

(30) Foreign Application Priority Data

Nov. 14, 1998 (GB) .................................................. 9824916

(51) Int. Cl.$^7$ ...................................................... F02B 31/08
(52) U.S. Cl. .......................... 123/302; 123/305; 123/308; 123/432
(58) Field of Search ..................................... 123/304, 305, 123/302, 308, 309, 295, 297, 299, 300, 430, 432, 568.17, 184.27, 184.37, 184.45, 184.52, 1 A, 310

(56) References Cited

U.S. PATENT DOCUMENTS

| | | | |
|---|---|---|---|
| 4,688,532 | * | 8/1987 | Hasegawa ............................ 123/302 |
| 5,111,791 | * | 5/1992 | Onodera ............................... 123/432 |
| 5,379,743 | * | 1/1995 | Stokes et al. ........................ 123/568 |
| 5,529,038 | * | 6/1996 | Tsuchida ............................... 123/305 |
| 5,799,638 | * | 9/1998 | Tsuchida et al. ..................... 123/302 |
| 5,894,826 | * | 4/1999 | Jaye ...................................... 123/295 |
| 6,125,817 | * | 10/2000 | Piock et al. ........................... 123/301 |
| 6,135,088 | * | 10/2000 | Duret .................................... 123/430 |

FOREIGN PATENT DOCUMENTS

| | | |
|---|---|---|
| 3224337 C1 | 10/1983 | (DE) . |
| 19854923 A1 | 6/1999 | (DE) . |
| 0390589 A2 | 10/1990 | (EP) . |
| 0594462 A1 | 4/1994 | (EP) . |
| 2278915 | 2/1976 | (FR) . |
| 2298896 | 9/1996 | (GB) . |

\* cited by examiner

*Primary Examiner*—Noah P. Kamen
*Assistant Examiner*—Hai Huynh

(57) ABSTRACT

A spark ignition internal combustion engine is described having a fuel supply system for separating the fuel into two or more continuous streams of fuel fractions having different octane ratings. The engine has an intake system that creates within each combustion chamber a stratified charge comprising at least two regions 113, 123 each containing a higher concentration of respective one of the fuel fractions. Each combustion chamber also has two spark plugs 114, 124 each located in a respective one of the stratified charge regions. The engine ignition system separately controls the spark timings of the spark plugs 114, 124 to vary the pattern of flame propagation through the stratified charge in the combustion chambers in dependence upon the engine operating conditions.

6 Claims, 1 Drawing Sheet

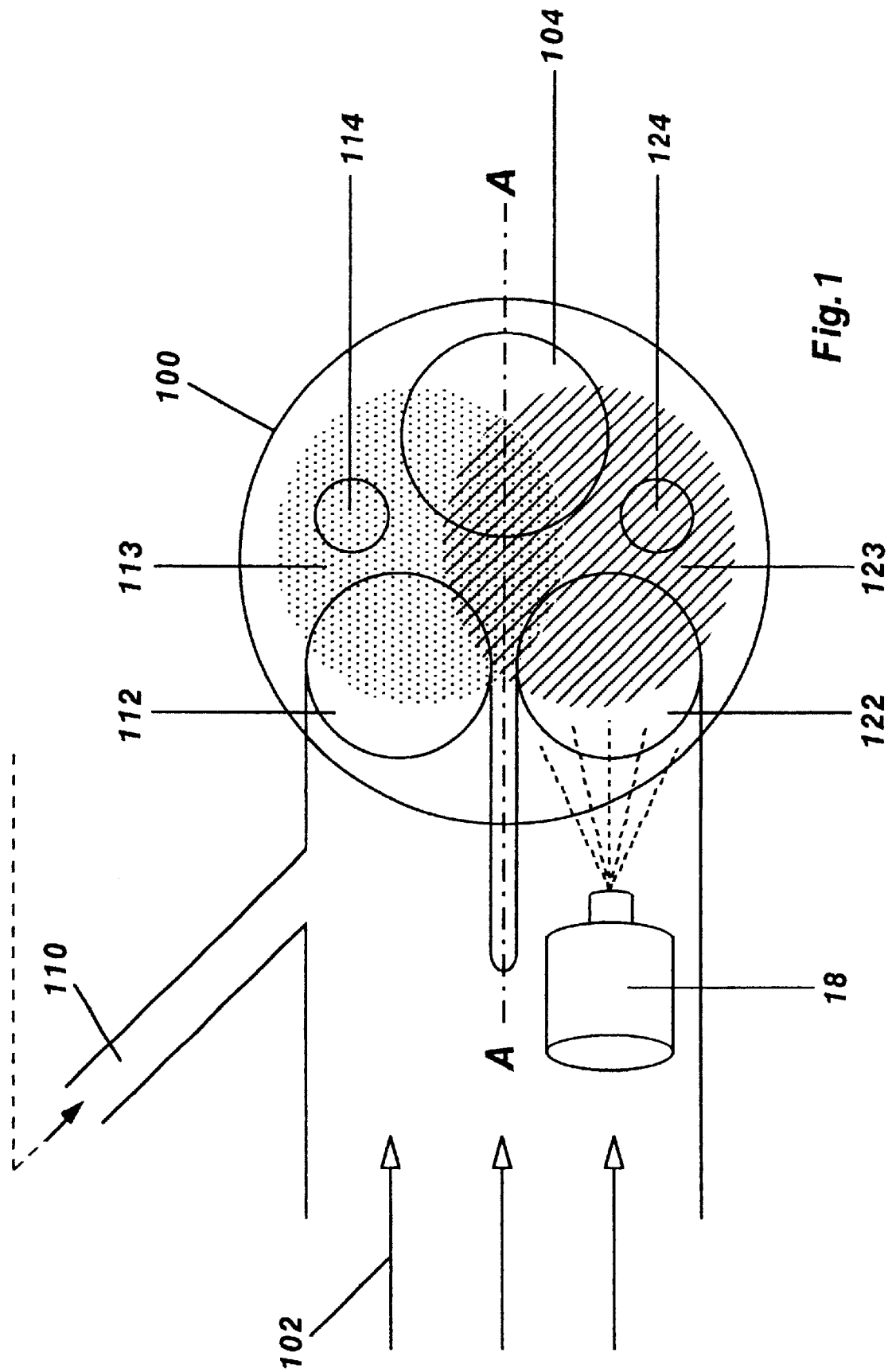

STRATIFIED CHARGE ENGINE WITH 2 SPARKS PLUGS

FIELD OF THE INVENTION

The present invention relates to a stratified charge spark ignition internal combustion engine.

BACKGROUND OF THE INVENTION

International Patent Application No. PCT/GB98/02292 describes a fuel fractioning system capable of separating the fuel into at least two continuous streams of fuel fractions having different octane ratings.

International Patent Application No. PCT/GB98/02754 describes an engine specifically designed to take advantage of the availability of two streams of fuel fractions having different octane ratings. In the latter engine, the intake system is designed such that the different fuel fractions reside in different regions of the engine combustion chambers. During high load operation, the higher octane fuel fraction is concentrated in the end-gas region remote from the spark plug with the aim of extending the knock tolerance of the engine and thereby allowing the compression ratio of the engine to be increased.

International Patent Application No. PCT/GB98/00614 describes another engine designed to take advantage of the availability of two streams of fuel fractions having different octane ratings in which the intake system is designed to promote stratification of the fuel fractions within the combustion chambers. In this case, it is the lower octane fuel fraction that is concentrated in regions remote from the spark plug with the aim of achieving controlled auto ignition under low and medium load operating conditions in order to minimise NOx emissions.

British Patent Application No. 9802766.7 describes an engine that combines the benefits of the above two proposals. The engine in this case has two-position swirl control valves in its intake ports and each combustion chamber has a single spark plug. The two-position swirl control valves serve to provide two stratified charge patterns of the fuel fractions in relation with the single spark plug such that in one position, for high load operation, the higher octane fuel fraction is concentrated in the periphery region of the engine combustion chamber in order to suppress knock and in the other position, for low and medium load operations, the lower octane fuel fraction is concentrated in the periphery region of the engine combustion chamber in order to promote controlled autoignition.

OBJECT OF THE INVENTION

The present invention seeks to provide an alternative engine design that takes advantage of the availability of continuous supplies of fuel fractions having different octane ratings to improve knock tolerance during high load operation and promote auto ignition during low and medium load operation.

SUMMARY OF THE INVENTION

According to the present invention, there is provided a spark ignition internal combustion engine having a fuel supply system for separating the fuel into two or more continuous streams of fuel fractions having different octane ratings, an intake system operative to create within each combustion chamber a stratified charge comprising at least two regions each containing a higher concentration of respective one of the fuel fractions, at least two spark plugs in each combustion chamber each spark plug being located in a respective one of the stratified charge regions and an ignition system for separately controlling the spark timings of the spark plugs to vary the pattern of flame propagation through the stratified charge in the combustion chambers in dependence upon the engine operating conditions.

In the invention, the stratification geometry of the fuel fractions can be fixed, avoiding the need for flow regulators or diverters in the intake system. Instead, the relative spark timing is used to control the flame propagation pattern to position the end gas in the lower or higher octane regions of the stratified charge to suit the operating conditions.

Thus, if under high load operation the spark plug in a lower octane fuel fraction region is fired first, the flame will spread from the lower octane region and will burn last in the higher octane region to reduce the tendency to knock. Conversely, if under low and medium load operating conditions the spark plug in the higher octane fuel fraction region is fired first, then the flame will spread from the higher octane fraction and will burn last in the lower octane fraction to promote auto ignition of the lower octane fraction and thereby reduce NOx emissions.

It is possible to initiate combustion from a single one of the spark plugs, but it is preferred to fire both spark plugs in each combustion cycle and to vary the relative spark timing of the spark plugs in dependence upon engine operating conditions.

In calculating the optimum spark timings for the two spark plugs for any given set of operating conditions, it is preferred not only to take engine load into account but also to take into consideration other parameters affecting flame propagation, such as mixture strength and EGR content of the different regions of the stratified charge. It is further possible to control the composition of the charge in the different regions in order to maximise the benefit achieved by the independent spark timings.

In a preferred embodiment of the invention, each combustion chamber of the engine has two intake valves and one exhaust valve arranged on the opposite side of the combustion chamber in the plane of symmetry which passes between the two intake valves. In this case, the two fuel fractions may be supplied separately through the two intake valves to form a stratified charge with the fuel fractions lying on opposite sides of the plane of symmetry. The two spark plugs in such an engine may conveniently be located one on each side of the plane of symmetry so that they lie in the halves of the engine cylinder containing the different fuel fractions.

The advantage of the invention is that the same stratified charge pattern of the fuel fractions can be maintained throughout the engine operating range while different combustion modes are selected. This eliminates the need for a switching device for the air or fuel flow which will otherwise be necessary in order to change the stratified charge pattern to suit the different combustion modes. In this invention, switching of the combustion mode is achieved quickly and reliably by simply switching the first firing pulse from one spark plug to another.

Engines are known that have two spark plugs per cylinder but in the known engines no special steps are taken to create a stratified charge containing different fuel fractions ignited by the different spark plugs. In the known engines, the combustion charge is homogeneous and the two spark plugs are fired simultaneously to improve the probability of ignition by providing two ignition sources, and to shorten the combustion period by creating two flame propagation kernels.

BRIEF DESCRIPTION OF THE DRAWINGS

The invention will now be described further, by way of example, with reference to the accompanying drawings, in which the single FIGURE shows a plan view of a combustion chamber of an engine of the invention.

DETAILED DESCRIPTION OF THE PREFERRED EMBODIMENTS

The engine of the invention is intended for use with a fuel supply system that provides continuous streams of fuel fractions having different octane ratings. In its simplest form, the supply system may comprise two different fuel tanks, for example one containing gasoline and the other containing LPG. However, it is more convenient to use a fuel supply system as described in International Patent Application PCT/GB98/02292 that uses waste engine heat to separate the fuel into different fractions by boiling point. In essence, fuel is evaporated in a volatising chamber in which the lower boiling point fraction is given off as vapour from the top of the volatising chamber and fed to the engine intake system while the higher boiling point (and higher octane) fraction remains as a liquid and collects at the bottom of the volatising chamber. The liquid fuel fraction is drawn by a fuel pump from the bottom of the volatising chamber and supplied to liquid fuel injectors. Fuel unused by the injectors is returned to the volatising chamber where it drips over an evaporator. As the fuel fractioning system is already known from the latter International patent application it is not believed necessary to describe it in further detail within the present context.

Referring now to the drawing, a combustion chamber 100 is illustrated having two intake valves 112, 122, an exhaust valve 104 and two spark plugs 114, 124. The exhaust valve 104 is arranged within the plane of symmetry AA lying between the two intake valves 112, 122 and is positioned on the opposite side of the combustion chamber from the intake valves 112, 122. Each of the intake valves has a respective intake port, the ports being connected to a common air intake duct 102. A liquid fuel injector 18 is arranged in the intake port leading to the intake valve 122, while a vapour supply pipe 110 opens into the intake port leading to the intake valve 112.

By virtue of this geometry the charge in the combustion chamber is vertically stratified with the lower octane vapour fraction concentrated in the dotted region designated 113 in the drawing, and the higher octane liquid fraction concentrated in the hatched region designated 123. The positioning of the spark plugs 114, 124 is such that the spark plug 114 ignites the region of the charge containing the lower octane fraction and the spark plug 124 ignites the region of the charge containing the higher octane fraction.

In the invention, the two spark plugs 114, 124 are connected to an ignition system that allows the spark timings of the two plugs to be controlled separately. Either one of the spark plugs 114, 124 may fire before the other depending on the engine operating condition, or they may be fired simultaneously. It is even possible to fire one spark plug but not the other in any given engine cycle.

The effect of varying the relative spark timing between the two spark plugs 114, 124 is to select the origin and direction of flame propagation through the combustion chamber and to select the composition of the charge in the end gas region.

When the spark plug 114 is fired long before the spark plug 124, the flame will burn the entire lower octane fraction 113 before combustion of the higher octane fraction 123 is completed thereby ensuring that only the higher octane fraction is present in the end gas. This is the ideal end gas composition for high load operation as it reduces the risk of knock.

Conversely, when the spark plug 124 is fired long before the spark plug 114, the flame will burn the entire higher octane fraction 123 before combustion of the lower octane fraction 113 is completed thereby ensuring that only the lower octane fraction is present in the end gas. This encourages spontaneous combustion of the end gas region. While such auto ignition is undesirable during high load operation because of the risk of damage to the engine, it is preferred during low and medium load operations because of the reduction in NOx emissions.

The flame propagation speed within each region of stratified charge of the fuel fractions will depend upon other factors, such as mixture strength and EGR content, and these too can be controlled at the same time as the spark timing to achieve the desired effects.

What is claimed is:

1. A spark ignition internal combustion engine having a fuel supply system for separating the fuel into two or more continuous streams of fuel fractions having different octane ratings, an intake system operative to create within each combustion chamber a stratified charge comprising at least two regions each containing a higher concentration of respective one of the fuel fractions, at least two spark plugs in each combustion chamber each spark plug being located in a respective one of the stratified charge regions and an ignition system for separately controlling the spark timings of the spark plugs to vary the pattern of flame propagation through the stratified charge in the combustion chambers in dependence upon the engine operating conditions.

2. An engine as claimed in claim 1, wherein the ignition system is operative to fire both spark plugs in each combustion cycle and to vary the relative spark timing of the spark plugs in dependence upon engine operating conditions.

3. An engine as claimed in claim 1, wherein means are provided additionally to control the flame propagation speeds in the different regions of the stratified charge by varying at least one of the mixture strength and the recirculated exhaust gas content of the different regions.

4. An engine as claimed in claim 1, wherein each combustion chamber of the engine has two intake valves and one exhaust valve arranged on the opposite side of the combustion chamber in the plane of symmetry which passes between the two intake valves.

5. An engine as claimed in claim 4, comprising means for supplying two fuel fractions separately through the two intake valves to form a stratified charge with the fuel fractions lying on opposite sides of the plane of symmetry.

6. An engine as claimed in claim 4, wherein the two spark plugs are located one on each side of the plane of symmetry.

* * * * *